United States Patent
Teague et al.

(10) Patent No.: US 12,238,110 B2
(45) Date of Patent: Feb. 25, 2025

(54) ACCESS MANAGEMENT FOR CANCELLED REQUESTS IN A DISTRIBUTED ENVIRONMENT

(71) Applicant: VISA INTERNATIONAL SERVICE ASSOCIATION, San Francisco, CA (US)

(72) Inventors: Paul Teague, Carryduff (IE); Lee James Kelly, Tyrone (IE)

(73) Assignee: Visa International Service Association, San Francisco, CA (US)

( * ) Notice: Subject to any disclaimer, the term of this patent is extended or adjusted under 35 U.S.C. 154(b) by 256 days.

(21) Appl. No.: 17/781,694

(22) PCT Filed: Dec. 18, 2019

(86) PCT No.: PCT/US2019/067249
§ 371 (c)(1),
(2) Date: Jun. 1, 2022

(87) PCT Pub. No.: WO2021/126193
PCT Pub. Date: Jun. 24, 2021

(65) Prior Publication Data
US 2023/0028823 A1    Jan. 26, 2023

(51) Int. Cl.
*H04L 9/40* (2022.01)
(52) U.S. Cl.
CPC ........ *H04L 63/102* (2013.01); *H04L 63/0876* (2013.01); *H04L 63/108* (2013.01)
(58) Field of Classification Search
CPC . H04L 63/0876; H04L 63/102; H04L 63/108; H04L 63/10
See application file for complete search history.

(56) References Cited

U.S. PATENT DOCUMENTS

| 5,500,890 A | 3/1996 | Rogge et al. |
| 2002/0138445 A1* | 9/2002 | Laage ................. G06Q 20/382 705/67 |

(Continued)

FOREIGN PATENT DOCUMENTS

| CN | 106688008 A | 5/2017 |
| CN | 107851144 A | 3/2018 |

(Continued)

OTHER PUBLICATIONS

Application No. CN201980102898.4, Office Action, Mailed On Nov. 2, 2023, 18 pages.

(Continued)

*Primary Examiner* — Chau Le
(74) *Attorney, Agent, or Firm* — Kilpatrick Townsend & Stockton LLP

(57) ABSTRACT

Embodiments of the disclosure are directed to methods, apparatuses, computer-readable media, and systems for network monitoring of communication requests for authorization to an access device. One embodiment is directed at dual message model in a distributed environment with an electronic access device receiving a cancellation signal and generating and sending a reversal message with cancellation information embedded in the data elements of the reversal message to a processor computer, where the cancellation data may be read and saved by the processor computer before the authorization request message is forwarded to be authorized by an authorization entity. The method further comprises generating a cancellation message after the reversal message has processed, where the cancellation message is sent via a transport computer to clear and reconcile the authorization status of the cancelled authorization request with any necessary authorizing or regulatory entities in the network.

19 Claims, 10 Drawing Sheets

(56) References Cited

U.S. PATENT DOCUMENTS

| | | |
|---|---|---|
| 2003/0212818 A1 | 11/2003 | Klein et al. |
| 2008/0021821 A1 | 1/2008 | Katyal et al. |
| 2010/0280914 A1 | 11/2010 | Carlson |
| 2014/0323082 A1* | 10/2014 | Browne ............... G06Q 20/027 455/406 |
| 2014/0324696 A1* | 10/2014 | Browne ............... G06Q 20/123 705/44 |
| 2015/0150110 A1* | 5/2015 | Canning ............. H04L 63/0807 726/9 |
| 2016/0148212 A1* | 5/2016 | Dimmick ........... G06Q 20/4014 705/44 |
| 2016/0248773 A1 | 8/2016 | Bildoy |
| 2019/0058713 A1 | 2/2019 | Pala |
| 2019/0251569 A1 | 8/2019 | Dimmick |
| 2020/0380490 A1* | 12/2020 | Jayachandran ........ G06Q 20/22 |

FOREIGN PATENT DOCUMENTS

| | | |
|---|---|---|
| CN | 110135126 A | 8/2019 |
| FR | 3031824 A1 | 7/2016 |
| JP | 2009541818 A | 11/2009 |
| JP | 2016520921 A | 7/2016 |
| WO | 2014013071 A1 | 1/2014 |
| WO | 2014041700 A1 | 3/2014 |
| WO | 2014179233 A2 | 11/2014 |

OTHER PUBLICATIONS

Application No. KR10-2022-7022568, Office Action, Mailed On Dec. 6, 2023, 9 pages.
Application No. CN201980102898.4, Office Action, Mailed On Mar. 28, 2024, 26 Pages.
Application No. JP2022-535135, Office Action, Mailed On Jul. 26, 2023, 4 pages.
Application No. PCT/US2019/067249, International Search Report and Written Opinion, Mailed On Jul. 28, 2020, 12 pages.
Application No. JP2022-535135, Notice of Decision to Grant, Mailed On Jan. 19, 2024, 1 page.
Application No. KR10-2022-7022568, Notice of Decision to Grant, Mailed On Aug. 27, 2024, 3 pages.
Application No. CN201980102898.4, Notice of Decision to Grant, Mailed On Jun. 10, 2024, 4 pages.
IN202247039900, "First Examination Report", May 29, 2024, 5 pages.

* cited by examiner

US 12,238,110 B2

ACCESS MANAGEMENT FOR CANCELLED REQUESTS IN A DISTRIBUTED ENVIRONMENT

CROSS REFERENCE TO RELATED APPLICATIONS

This application is a 371 patent application which claims the benefit of the filing date of International Application Application No. PCT/US2019/067249 filed Dec. 18, 2019, which is herein incorporated by reference in its entirety for all purposes.

BACKGROUND

It is often desirable to allow only a select group of people to have access to some protected resource. However, networks may span large areas and may be composed of many smaller networks that are controlled by different organizations. Authorization requests may then have to traverse a network composed of smaller networks. The management and monitoring of authorization requests for a protected resource can be difficult, particularly when transmission errors occur.

BRIEF SUMMARY

Embodiments of the present disclosure are directed at methods, apparatuses, computer readable media, and systems for enabling network monitoring of communication requests for authorization to access a resource. For example, techniques can enable network monitoring cancellations of authorization requests that occur mid-process. Such an example can occur using a dual message model in a distributed environment. Software programmed on an access device can generate a reversal request message and can add cancellation data to the reversal request message. Cancellation data can be batched at a processor computer, and, after a successful reversal reply message is received, the cancellation data can be formatted into a cancellation message and sent to a transport computer for reporting on reconciliation.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

TERMS

Figure 1:
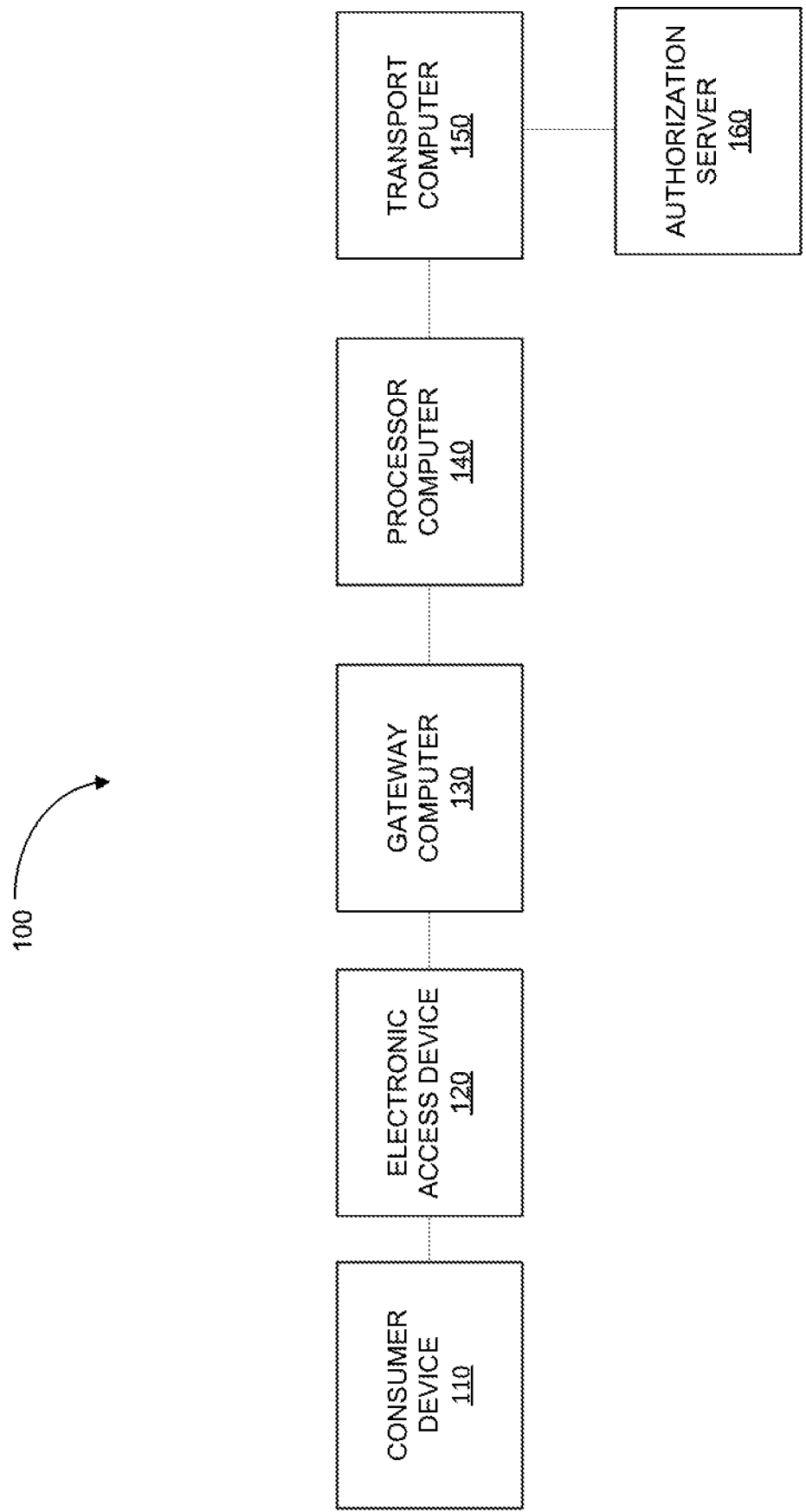
FIG. 1 demonstrates a network of computer systems implementing the disclosure as encompassed by the embodiments of the disclosure.

Prior to discussing embodiments of the disclosure, description of some terms may be helpful in understanding embodiments of the disclosure.

An "authorization request" may include a message comprising a request to access a resource, where such communication may involve a transaction. For example, the authorization request may be sent from mobile device associated with a client device for accessing a computer, a building, or goods or services, which may be managed by an access device and/or resource provider computer. The authorization request may include any relevant information to the transaction including payment information (e.g., account identifiers, personal information, etc.), transaction information (e.g., merchant information, items being purchased, etc.), device information (e.g., mobile device phone number, secure element identifier, etc.), routing information (e.g., internet protocol (IP) address of a destination computer, identifier for destination computer, bank identification number (BIN), etc.), and any other relevant information to a transaction. For example, an authorization request may include encrypted payment information for a transaction and may be sent to a third party computer that is configured to authenticate the request, validate a public key certificate, decrypt the encrypted payment information, extract a public key from the validated certificate, re-encrypt the decrypted payment information, and send the re-encrypted payment information to a transaction processor for initiation of a payment transaction. Accordingly, the authorization request may include any information relevant to the secure process for transmitting sensitive data to a server for processing and authenticating an authorization request.

"Transaction information" may include any data associated with a transaction. For example, transaction information may include a transaction amount, transaction time, transaction date, merchant information (e.g., registered merchant identifier, address, merchant computer IP address, etc.), product information (e.g., serial numbers, product names or other identifiers, etc.). The transaction information may be provided to a communication device (e.g., mobile device) by a merchant server computer before or after the user initiates a payment transaction through the merchant application. In some embodiments, the transaction information may be used to identify a specific merchant associated with a transaction using the merchant information included in the transaction information.

An "authorization response" may include a message comprising a response to an authorization request. For example, the authorization response may be sent from an authorization server computer in response to a purchase request associated with an authorization request associated with goods or services provided by a merchant. Another example could be a message in response to a request for access to secure computer files in a database. The authorization response may include any relevant information to the authorization request, as described herein. For example, an authorization response may include re-encrypted payment information that has been encrypted with a transaction processor public key and may be sent to the transaction processor for further processing. For instance, the transaction processor may decrypt the re-encrypted payment information using a transaction processor private key and may initiate a payment transaction using the decrypted payment information. Further, in some embodiments, the payment response may include authentication response information that identifies whether a transaction, account, consumer, and/or other entity to a transaction has been authenticated.

A "gateway computer" can be a server computer or a series of server computers that are configured to communicate with a communication device. For example, a mobile gateway may communicate with a mobile device using over-the-air (OTA) messages or using any other communication networks and protocols. For instance, the gateway computer may be configured to provide a secure communications channel (i.e., secure channel) with an electronic access device over which information can be transmitted securely to and from the electronic access device using a communications network, such as the Internet, and/or any other relevant communications network.

A "server computer" may include a computer or cluster of computers. For example, the server computer can be a large mainframe, a minicomputer cluster, or a group of servers functioning as a unit. In one example, the server computer may be a database server coupled to a web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor computer" may include any entity that is associated with processing an authorization request, e.g., as part of a transaction. For example, a merchant processor computer, an acquirer computer, a payment processing network, and any other entity in a transaction processing eco-system may be a transaction processor. In some embodiments, a transaction processor may be associated with a particular public key (e.g., merchant public key, merchant application public key, acquirer public key, etc.) and private key (e.g., merchant private key, merchant application private key, acquirer private key, etc.) that may be used to encrypt and decrypt payment information during processing of a remote payment transaction.

As such, in some embodiments, the processor computer may include any entity configured to decrypt the encrypted (or re-encrypted) payment information and initiate a payment transaction. A payment transaction may be initiated through any suitable manner including passing the decrypted payment information to another party or by generating and/or mapping decrypted payment information to an authorization request message. For example, in some embodiments, the processor computer may initiate a payment transaction by mapping the decrypted payment information to an authorization request message configured to be processed by a payment processing network. A processor computer may also function as an intermediary between two different networks by transcribing message information from one messaging format into another.

An "authorization entity" may typically refer to a computer that analyzes information (e.g., user and/or device credentials) in an authorization request to determine whether to provide access to a resource. The authorization entity may recognize account information pertaining to a user within transaction messages, such as an authorization request message or a reversal request message, and is authorized to either accept or decline transactions based on its account records, among other indicators, such as fraud detection indicators. Each entity may comprise one or more computer apparatuses to enable communications or to perform one or more of the functions described herein.

A "transport computer" is a computer or group of computers capable of transporting a transaction message to an appropriate authorizing entity. This could be done by computers associated with an acquiring bank where the merchant performing the transaction has an account, or could be a third party service.

A "cancellation message" may include a message comprising cancellation data in response to a cancelled authorization request. For example, the cancellation message may be sent from a server computer in response to a purchase cancellation request associated with an authorization request associated with goods or services provided by a merchant. The cancellation message may include any relevant information to the authorization request, including payment information (e.g., account identifiers, personal information, etc.), transaction information (e.g., items being purchased, merchant information, etc.), device information (e.g., mobile device phone number, secure element identifier, etc.), routing information (e.g., internet protocol (IP) address of a destination computer, bank identification number (BIN), etc.), cancellation type information (e.g. card withdrawn prematurely, merchant cancelled, transaction timeout, etc.) and any other relevant information. For example, a cancellation message may include re-encrypted payment information that has been encrypted with a processor computer public key and may be sent to the processor computer for further processing. For instance, the processor computer may decrypt the re-encrypted payment information using a processor computer private key and may initiate a payment request using the decrypted payment information. Further, in some embodiments, the payment response may include authentication response information that identifies whether an authorization request, account, consumer, and/or any other entity associated with an authorization request has been authenticated.

"Cancellation data" may include any information that may be stored on a digital medium that pertains to a cancellation of an authorization request. For example, cancellation data can include the time that the cancellation occurred, the reason why the cancellation occurred (e.g., a user device was withdrawn too early, cancellation was signaled at the access device by a button press or similar input, etc.), the status of the access device during cancellation, the location of the cancellation, the amount and substance of the cancelled transaction, etc. Cancellation data may include any digital information pertaining to the hardware associated with cancelled authorization request, the circumstances surrounding the cancelled authorization request, and any pertinent data associated with the cancellation.

Cancellation data may also include data flags that may be used to point or route a processor to the memory location where additional cancellation data is stored. Cancellation data may also be stored efficiently in a message in the form of a cancellation data flag/identifier pair. A data flag may indicate, among other things, the type of cancellation performed, the memory location of stored cancellation data, etc., and may be associated with a request identifier that is assigned to an authorization request.

A "data flag" may correspond to one or more characters (e.g., a string of hexadecimal or binary) within a message, such as an authorization reversal message, that are configured to be recognized by a computer as corresponding to one or more predefined values. For example, a data flag may indicate to the computer that there is cancellation data stored in the data elements of a message. As another example, a data flag indicate the type of cancellation associated with a cancelled authorization request. Additionally, a flag may also be used as a reference to the address of a database where data is stored.

An "authorization status" is an indicator connected to an authorization request that indicates the present state of that authorization. For example, an authorizing entity such as an issuer bank may record data about authorization requests, and may apply to each of those authorization requests an authorization status. The authorization status may indicate that an authorization request has been authorized, declined, reversed, or cancelled, among other authorization statuses. An authorization status may differ between two entities. For example, one entity may record that an authorization request is reversed, while another may record that the authorization request was cancelled. These differences may be reconciled through a reconciliation process, where the all necessary entities in a transaction network may be updated as to the current status of a transaction's authorization status.

A "transaction network" is a network of computers and entities that are connected and adhere to the same messaging format and legal requirements in order to facilitate transactions between parties.

A "request identifier" is an identifier associated with an authorization request such that any future messages associated with the authorization request that continue communications regarding the authorization status may be identified to be associated with the correct authorization request. A request identifier may be given to an authorization request message and then used to identify that an authorization response message is a response message responding to the initial authorization request message of the transaction. A request identifier may be used to track various messages associated with an authorization request, such as for a reversal request message or a cancellation message.

An "access device" is any device that allows a user or user device to access a transaction network in order to facilitate a transaction with an authorization computer. An access device may be a physical device such as a payment terminal or card reader, or it could be comprised of executable code, such as an authorization application. The access device, regardless of form, is capable of taking the credentials of a user (or user device) and using those credentials to generate an authorization request message in order to initiate a transaction with an authorization computer. An access device may also be able to transmit, receive, and interpret transaction messages in order to process transactions. An access device may have memory for local storage, where it may store additional data, such as transaction information, that may be used in executing its function. With or without memory for local storage, an access device may still utilize a computer executable medium to store transaction information on an offsite database.

DETAILED DESCRIPTION

Embodiments of the present disclosure are directed to systems and methods for processing mid-authorization cancellations in a distributed environment in such a way as to reconcile the authorization status associated with an account between relevant entities within the distributed environment. The distributed environment may be any transaction environment encompassing different networks that operate under different protocols.

When initiating an authorization request in a distributed environment, embodiments may facilitate mid-authorization cancellations between two differing authorization networks with different messaging protocols. An authorization request message can be generated and processed through a transaction network. When the authorization is cancelled, a reversal message can be generated after the authorization message has been processed and successfully performed. The reversal message can then be processed through the transaction network to undo any exchange or authorization that was authorized by the authorization message. The reversal message can then be stored for an end-of-day reconciliation process to ensure that all entities within the network are in agreement as to the authorization status (e.g. whether or not the authorization request is authorized, reversed, or cancelled).

When dealing with authorization requests in a distributed environment, different networks may have different standards to be met. For example, one network may only require reconciliation at the end of the day to mark the difference between a cancelled authorization request and a reversed authorization request. Some networks may also require that a user initiating an authorization request is capable of cancelling that authorization request mid-process, while other networks may not require this feature. Moreover, some networks may require alerting a regulatory authority about the cancellation and recording certain details of the cancellation, such as the location where the cancellation took place, what time the cancellation took place, the type of cancellation that took place, etc.

Embodiments of the present disclosure can manage cancellations that occur mid-authorization in a distributed environment. Cancellation data may be included in authorization reversal messages. Such cancellation data may include a data flag in the data elements of the authorization reversal message (e.g., the message may contain a flag that references the type of cancellation, may direct a computer to a memory location where data from an authorization request message is stored, etc).

An electronic access device may be programmed with an API, SDK, app, applet, or any other form of executable code to recognize when a cancellation has occurred. An example of this may be a card user removing their card prematurely to initiate a cancellation. The electronic access device may then generate a reversal message that includes additional cancellation information (e.g., a data flag that may be read by a computer as, among other things, a cancellation type indicator and/or a pointer value that references a memory location where the cancellation data is stored) into the data elements of the reversal message. This flagged information could include any cancellation data required by a transaction network, such as the location that the cancellation took place at, the time that the cancellation occurred, the cause of the cancellation, etc.

The cancellation data contained in the reversal message may then be sent from the electronic access device to a processor computer that is configured to identify and store the cancellation data either directly or as a data flag in the reversal message. In one embodiment, the cancellation data may be stored as a cancellation type flag that is associated with a request identifier, signaling to the processor computer by the cancellation type flag what the type of cancellation is and referencing this type data to the request identifier associated with the cancelled authorization request message.

The processor computer may then route the reversal message to a transport computer, which may then route the reversal message to an authorization entity in a distributed environment for the authorization reversal to be authorized. After the authorization reversal has been authorized, the processor computer may use the stored cancellation data to generate a cancellation message. This message may be sent through a transport computer to any necessary entity in order to reconcile the authorization status and to meet any regulatory requirements necessary for conducting authorizations in that transaction network.

Embodiments of the disclosure can have several advantages. For example, the embodiments allow for a seamless interconnectivity between networks with varying formatting and protocols. A user desiring to make a transaction with a merchant whose account is managed by an entity in a different transaction network than the user may easily carry out a transaction without even realizing that extra steps are being taken to ensure compliance, and the user is also able to cancel an authorization request in mid-process even while conducting the authorization request through a processor computer and a transport computer that is part of a transaction network that does not require this function. The embodiments can also allow for authorizing authorities in separate transaction networks to reconcile the authorization status of the authorization request such that there is no disagreement between various entities about the authorization status. In addition, the embodiments can provide a method by which this functionality may achieved for both an online and offline authorization request model. The embodiments can also allow for this functionality to be achieved without the need for storing cancellation data on local databases, such as a memory unit on the electronic access device or a hard drive at an access device, allowing for the data to be automatically stored in a more secure fashion where it is unlikely that the hardware might be stolen and cracked by anyone seeking to gain access to the stored transaction data.

I. System Overview

A. Overall System

FIG. 1 shows a block diagram of an exemplary computer network system 100 for performing an authorization request according to some of the embodiments of the disclosure. The system 100 comprises a user device 110 (e.g., a credit card or payment enabled mobile device), an electronic access device 120 (e.g., a payment terminal), a gateway computer 130, a processor computer 140 (e.g. a payment service provider), a transport computer 150 (e.g. an acquiring bank), and an authorization server 160. The various entities may be configured together to communicate with one another over any suitable wireless or wired communication network and using any suitable communications protocol, including open or proprietary communications protocols.

The devices listed above may be configured together such that they may process authorization requests in order to allow a user to access a protected resource. For example, a user device 110 may signal the electronic access device 120 to generate an authorization request message. The electronic access device 120 may then send the authorization request message to the gateway computer 130, which may then route the authorization request message to the processor computer 140. The processor computer 140 may save data from the authorization request message to a local or distributed database, and then may pass the authorization request message to the transport computer 150. The transport computer 150 may then read routing data from the authorization request message, and the use the routing data to transfer the authorization request message to an authorization server 160. The authorization server 160 may then read any credentials contained within the data of the authorization request message and may use the credentials in the message to generate an authorization response. This authorization response may either allow or deny the user access to a protected resource (e.g., secure files on a protected database, a signal for a lock on a security door to open, initiation of a payment transfer, etc).

The user device 110 may be any device used by a user to initiate a transaction with an authorization entity. This may be accomplished through a variety of means, such as wireless technologies like near field communications (NFCs), or through physical contact methods such as a card with a chip or magnetic stripe.

The electronic access device 120 is any device used to access a network in order to facilitate a transaction with an authorization entity. The electronic access device 120 may have an interactive interface for a user to interact with as well as a device reader for interacting with the user device 110. It may or may not be capable of storing user transaction data in a memory or local database for local storage. The device may have embedded application programming interfaces (APIs) and software developer kits (SDKs), and may include any app, applet, or other executable code designed to process and route authorization requests based on the credentials presented by the user device 110.

User device 110 may also be used to generate and route authorization reversal messages, and may have the capability of storing cancellation data (e.g., data flags indicating information such as cancellation type, flags that reference a memory address where cancellation data is stored, etc.) and embedding that cancellation data into a reversal authorization request message. Gateway computer 130 may also have such functionality.

The processor computer 140 may include data processing subsystems, networks and operations used to support and process authorization request data. For example, the processor computer 140 may receive and transmit authorization request messages as well as generate and transmit new messages. The system may also have data storage modules for storing transaction and network data. The processor computer 140 may include one or more server computer. A server computer is typically a powerful computer or cluster of computers. For example, the processor computer 140 can be a large mainframe, a minicomputer cluster, or a group of servers functioning as a unit. In one example, the server computer may be a database server coupled with a Web server. The processor computer 140 may use any suitable wired or wireless network, including the Internet. The processor computer 140 may be able to receive additional authorization request messages from additional access devices, may provide additional request identifiers associated with the additional authorization request messages, and may be capable of generating additional cancellation messages in association with the additional authorization request messages.

The processor computer 140 may also be configured to recognize data flags contained within received messages that indicate a cancellation of an authorization request. The processor computer may be programmed to recognize cancellation data contained within reversal authorization request messages. The cancellation data contained within the reversal authorization request messages may include data flags indicating the type of cancellation performed, data flags referencing the address of a database where additional cancellation data may be stored, etc.

The transport computer 150 is a computer or network of computers associated with an entity that maintains accounts for a merchant and may route authorization requests initiated by the electronic access device 120 associated with that merchant. The transport computer may receive authorization request messages and authorization reversal messages in a pre-determined format and may route those messages through a network to an authorization entity in order to provide authorization approval or rejection.

The authorization server 160 receives the authorization request message routed from the transport computer 150. The authorization server may then read any credential data from the authorization request message, and may compare that credential data to credential data stored in a database. If the authorization server 160 determines that the authorization request is from a device that is approved to access a protected resource, the authorization server 160 may generate a positive authorization response message to be routed back to the electronic access device 120. If the authorization server determines that the authorization request is from an unauthorized device, it may decline to provide access to a protected resource and may generate a declined authorization response message to be routed back to the electronic access device 120.

B. Authorization Process in a Distributed Environment

Figure 2:
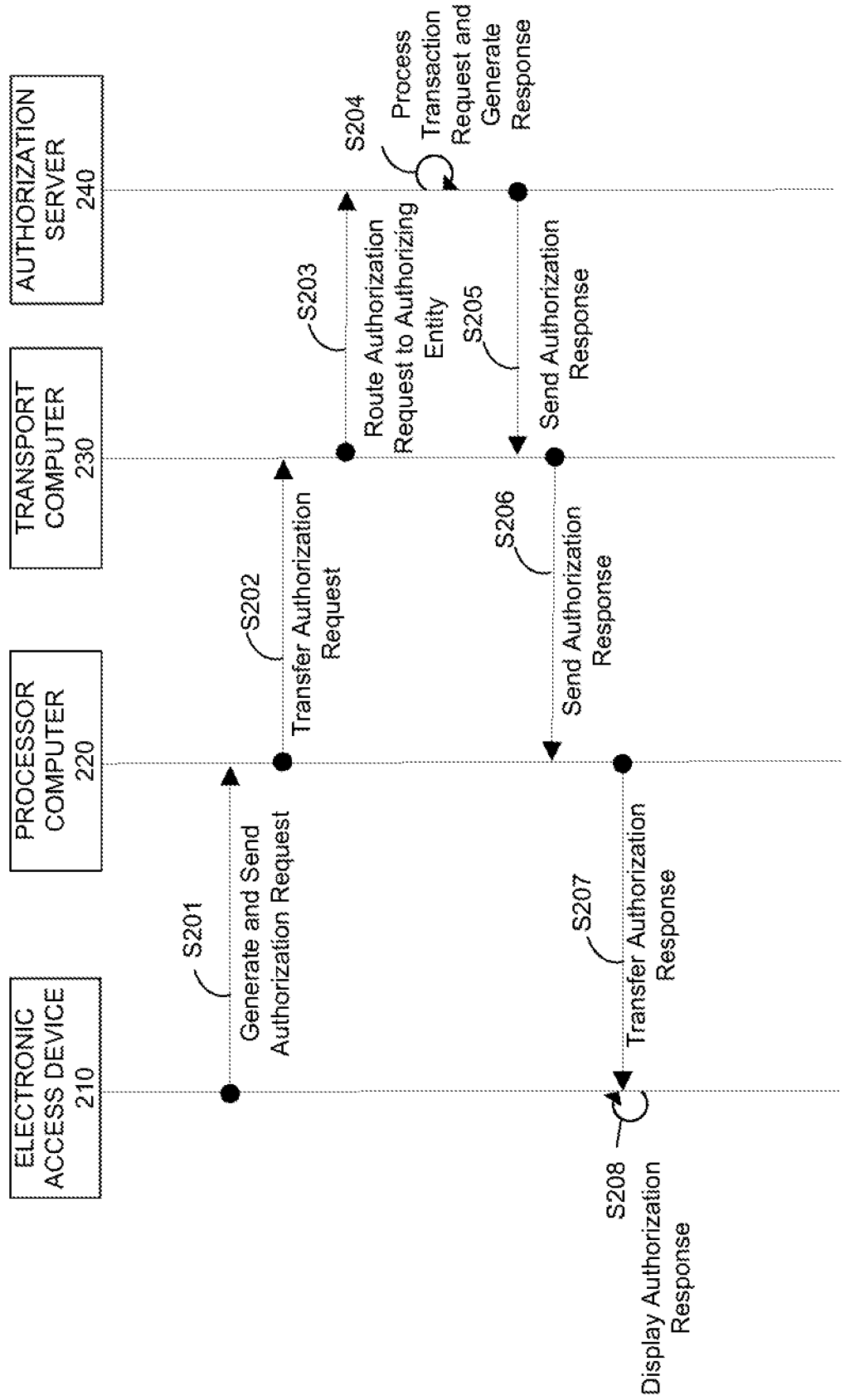
FIG. 2 shows a sequence diagram detailing the process flow for a typical transaction using an electronic access device and a processor computer, according to some embodiments of the disclosure.

FIG. 2 shows a sequence diagram representing the process flow of a an exemplary method 200 for processing a transaction between an electronic access device 210 and a transport computer 230.

In step S201, the electronic access device 210 can be triggered to generate and send a network message, such as an authorization request message, to the processor computer 220. The authorization request may be sent directly from the electronic access device 210 to the processor computer 220, or it may pass through other networking computers, such as a gateway computer 130, as shown in FIG. 1. The authorization request is an electronic message comprised of data read from a user device and/or from the electronic access device, and may include a message identifier, bitmaps (e.g., a string of hexadecimal or binary digits encoded in the message to provide metadata about the content of the message, for a device that reads the message), and data elements. Information such as account information associated with a user's device or account may be stored in the data elements in order to facilitate the transaction.

In step S202, the processor computer 220 may process the information contained within the authorization request and transfer the authorization request to the appropriate transport computer 230 based on the account information contained in the authorization request message. The processor computer 220 may store message data in a database, and this stored data may be used to generate additional transaction messages, such as end-of-day clearing and reconciliation messages.

In step S203, the transport computer 230 may send the authorization request to an authorizing entity, such as the authorization server 240. The transport computer 230 may route the authorization request message to any necessary authorization entity, such as an issuer bank, or the transport computer 230 may act as both a transport computer and as an authorizing entity. The authorizing entity may receive the authorization request message and respond with an authorization response message that may either accept or decline the authorization request message, based on the authorization entity's assessment of the authorization request message. This assessment may include determining whether there are sufficient funds in a purchaser's account, a determined likelihood that the authorization request is fraudulent, etc.

In step S204, the authorization server 240, after either receiving an authorization response message from the transport computer 230, may read and analyze the data contained within the authorization request message and retrieve any identification or credential data from the authorization request message. This credential data may be used to determine if the authorization request is from an authorized device and if access to a protected resource may be granted in response to the authorization request message. The authorization server may then generate an authorization response message containing the results of its determination of whether or not to grant access to the protected resource.

In step S205, the authorization server 240 may send the authorization response to the transport computer 230 based on the routing data associated with the authorization request message stored in the data elements of the authorization response message.

In step S206, the transport computer 230 may read the routing data contained in the data elements of the authorization response message and route the authorization response message to the processor computer 220.

In step S207, the processor computer 220 may read the routing data contained in the data elements of the authorization response message and route the authorization response message to the electronic access device 210.

In step S208, the electronic access device 210 can display the response contained in the authorization response message to the user and any other required party, alerting them to the authorization status of the authorization request.

There are presently numerous applications where authorization requests must be processed in a distributed environment, where each transaction environment has differing regulations and message formatting requirements. An example application could be a user gaining authorized access to a remote server that is on a different network from the user, or another example could be a user gaining access to a building by authorizing the user's identity with a keycard via a scanner connected to a remote authorization server. It may be desirable to process a mid-transaction cancellation from an access device, as well as provide information about cancelled transactions. This sensitive cancellation data may be stored on user-facing electronic devices, which could be stolen and cracked. In addition, "thin" terminals without an attached hard drive cannot store this information, and so cannot be used in certain markets. It would be helpful to provide solutions that can facilitate transactions while meeting varying regulations and formatting in a distributed environment while offering a more secure method for monitoring and managing cancellation data.

II. Cancellation of Authorization Request

An authorization process can begin when a transaction is initiated at an electronic access device by sending an authorization request message, but the electronic access device can signal to cancel the authorization request before the authorization response is received. The electronic access device may be signaled in numerous ways. For example, a user may withdraw a user device (e.g., a payment card, a door keycard, or an app-enabled phone, which may use near field communications (NFC) to interact with a sensor-linked computer) prematurely, which can automatically signal the electronic access device to initiate cancellation processes. A user or merchant may also cancel the request through an interactive interface of the electronic access device. This could include selecting a "cancel" option on a touch screen, or pressing an analog "cancel" button.

Another method by which the electronic access device may be signaled to begin cancellation processes is in the event of a timeout. A timeout event can occur when the authorization response message takes too long to return to the electronic access device and triggers the electronic access device to automatically cancel the transaction. Timeout events may be caused by any event that disrupts or delays the processing of an authorization message, such as a network outage. The authorization may also be cancelled by any other desired stimulus.

Once the electronic access device has been signaled to begin the cancellation process, the electronic access device can generate an authorization reversal message. The authorization reversal message can contain data similar to that of an authorization reversal message generated for reversing a completed authorization request would contain, but the reversal message generated for the cancellation may contain additional cancellation data stored in the data elements of the authorization reversal message. The electronic access device can then send the authorization reversal message with the cancellation data embedded in data elements of the authorization reversal message to the processor computer.

The processor computer can receive the reversal message and can identify that it is a reversal message for a cancelled authorization request message. As examples, the processor computer may identify the reversal message as a reversal message correlated to a cancelled authorization request using a request identifier. As examples, such a request identifier may be a marker in the message's type identifier, data elements, and/or its bitmaps. Embodiments may recognize that the reversal message correlates to a request identifier associated with an authorization request that has not yet returned an authorization response message. Upon recognizing that the reversal message received from the electronic access device contains an indication that the message includes cancellation data (e.g., via a cancellation identifier), the processor computer may read that cancellation data (e.g., a data flag or flags signifying, among other things, the type of cancellation that was performed, the memory location where the cancellation data is stored, what request identifier is paired with the reversal message, etc.) from the data elements of the reversal message and may also retrieve the cancellation data from data storage. This data storage may be either a local data storage, such as a local database, or in a distributed memory system, such as a cloud database.

After storing the cancellation data from the reversal message, the processor computer can then transfer the reversal message to the transport computer. The transport computer can then route the reversal message to authorization server, the same authorization entity that the original authorization message for the cancelled authorization request was routed to. The authorization entity can then confirm or deny the reversal, and sends back a reversal response message, which can be routed back through the same network to the electronic access device to indicate to the user if the authorization reversal was successful.

After the authorization reversal has been successfully processed, the processor computer may then use the stored cancellation data to generate a cancellation message. This cancellation message may contain any information pertinent to the cancellation, such as the type of cancellation that was performed (e.g. card withdrawn, merchant canceled, timeout event, etc.), the time that the cancellation occurred, the location of the cancellation, the transaction amount that was cancelled (if applicable), etc. The cancellation message may be configured to contain any cancellation data necessary for reconciling the authorization status with any entity in other transaction networks and to meet the requirements of reporting any necessary cancellation data to a regulatory authority.

Sending the cancellation message may be done any time after the reversal response message has been received, and may be delayed until an end-of-day reconciliation process, or sent sooner to ensure authorization status agreement between different transaction networks.

A. Cancellation Process

Figure 3:
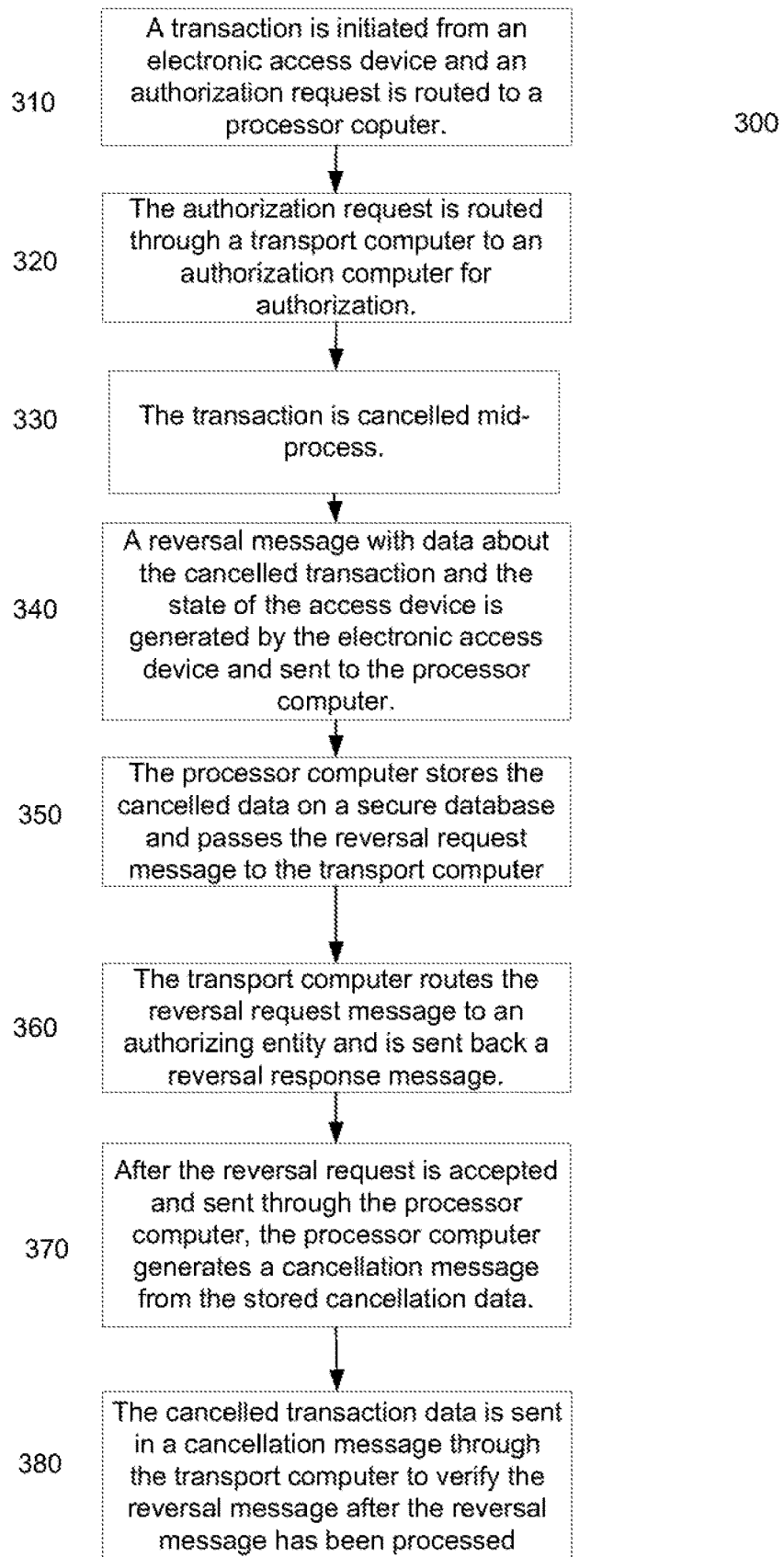
FIG. 3 shows a flow diagram of an overview of the process flow of the method according to some of the embodiments of the disclosure.

FIG. 3 shows a flow diagram detailing the typical steps of method 300 for processing a mid-process cancellation of an authorization process. Computers in FIG. 1 may be used to implement method 300.

In step 310, an authorization request can be initiated from the electronic access device. The authorization request may be initiated in a variety of ways, e.g., by swiping a keycard or payment card, entering a code, etc.

In step 320, the electronic access device generates an authorization request message that can be sent through the processor computer, to a transport computer, and then sent to an authorizing entity, such as authorization server 160. The electronic access device may wait to receive an authorization response message from the authorizing entity. The electronic access device may also have memory for local storage used to record transaction data and cancellation data.

In step 330, the authorization request is cancelled before completion, e.g., in the middle of the authorization process. This cancellation may occur at any step of the authorization request process prior to the electronic access device displaying the authorization response message received from the authorizing entity. The cancellation may be signaled in a variety of ways, such as the user or merchant cancelling the authorization request by prematurely withdrawing user credentials or pressing a button on the electronic access device's interface. The cancellation may also be triggered by a timeout event, where the transaction time exceeds a predetermined threshold and the electronic access device is automatically triggered to cancel the authorization request rather than continue waiting.

In step 340, in response to the signal to cancel the authorization request, the electronic access device may generate a reversal message to reverse the authorization request and may add data about the cancellation into the data elements of the reversal message. This data may, among other things, include data flags for indicating information such as the type of cancellation that occurred, the request identifier that is associated with the cancelled authorization request message, and flags referencing a database address where additional cancellation information may be stored. This cancellation data may include the type of cancellation that was performed and the state of the access device at cancellation (e.g. user device withdrawn, timeout event, merchant cancelled, etc.), the time of cancellation, the time that the original authorization request message was sent, the location of the cancellation, etc. The reversal message with the cancellation data stored in its data elements may then be sent to the processor computer.

In step 350, the processor computer may store the cancelled data at a memory location in a database (e.g., a secure database that is behind a firewall) that is associated with the respective identifier associated with the cancelled authorization request that was generated in step 310. The database may be any method of data storage, such as a local hard drive or cloud storage. The processor computer may store multiple request identifiers associated with multiple authorization requests corresponding to additional access devices. The processor computer may then transfer the reversal message associated with the respective identifier to the transport computer.

In step 360, the transport computer may pass the reversal message through a transaction network to the same authorization entity, such as the authorization server, that the authorization request message was sent to in step 310. The authorization entity may either approve or decline the reversal, and then send a reversal response message back to the transport computer.

In step 370, the reversal response may be sent from the transport computer back to the electronic access device. Information about the reversal response can be displayed at the electronic access device. After the reversal response is displayed, the processor computer may generate a cancellation message from the cancellation data that was stored in step 340. The cancellation message may be in any suitable format, such as an ISO 8583 0146 message.

In step 380, the cancellation message containing the cancellation data may be sent through the transport computer to verify the reversal message has been processed and to reconcile the authorization status of the authorization request such that all transaction networks agree that the authorization was reversed. The processor computer may also generate a batch message with the data from multiple cancellation messages from multiple access devices. This batched message may be used to update the transaction status of multiple authorization request messages simultaneously, such as in an end of day clearing process.

B. Sequence of Cancellation Process

Figure 4:
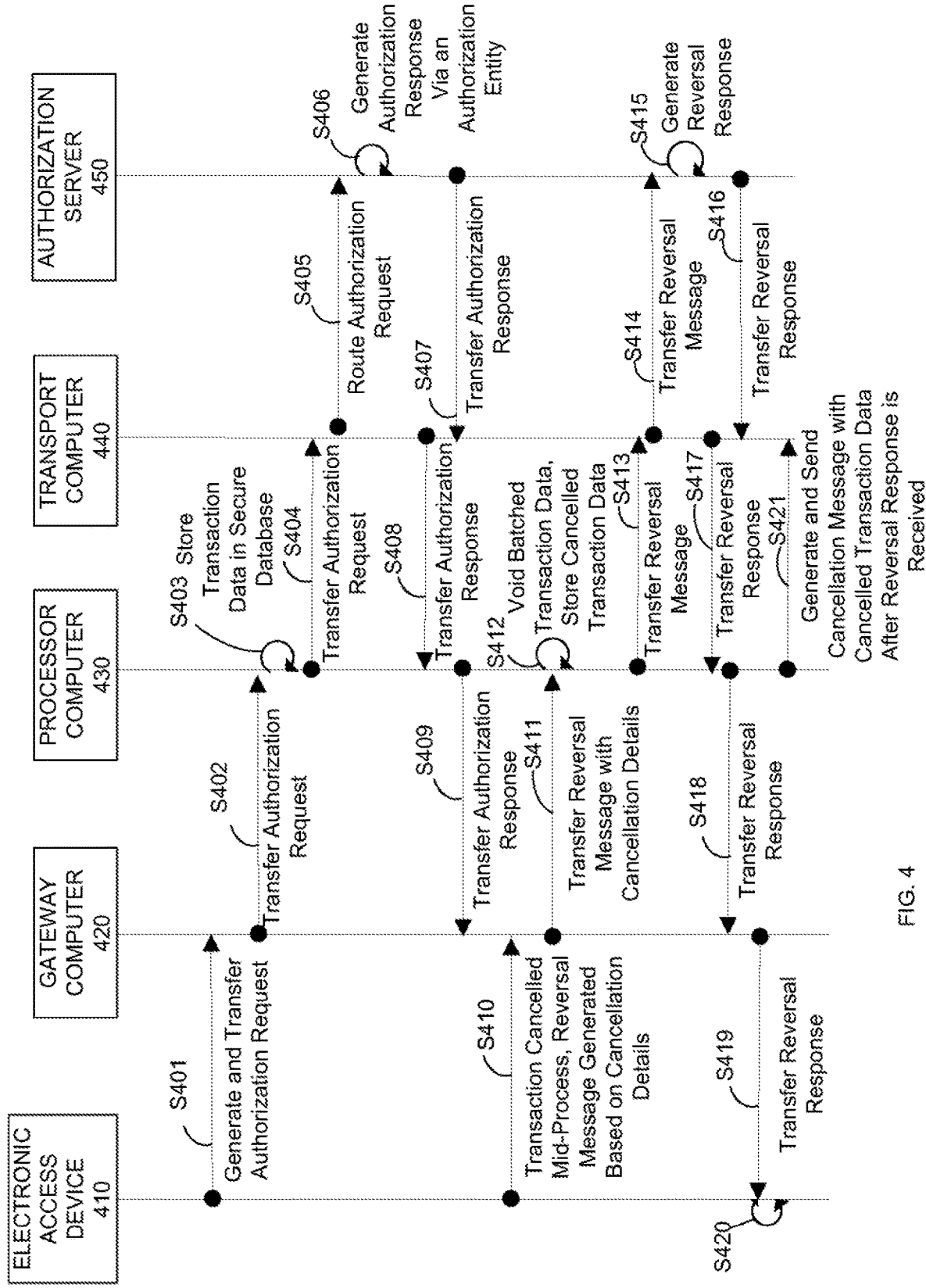
FIG. 4 shows a sequence diagram (such as the one disclosed by the inventors) detailing the process flow between the network of computer systems, according to some embodiments of the disclosure.

FIG. 4 shows a sequence flow diagram detailing exemplary method 400 for cancelling an authorization request mid-process using an electronic access device 410 to initiate a reversal message that may be used by the processor computer 430 to generate a cancellation message that may be used to reconcile the authorization status of the user's account across different transaction networks after the reversal is processed.

In step S401, the electronic access device 410 may be triggered to generate a network message, such as an authorization request message, based on the credentials of a scanned user device. The electronic access device 410 may pass the authorization request message directly to the processor computer 430, or it may first pass the authorization request message through a computer network such as the gateway computer 420 as depicted in FIG. 4. The function of the gateway computer 420 and the processor computer 430 may be combined into a single server.

In step S402, the gateway computer 420 may receive the authorization request message from the electronic access device 410, read the routing data contained in the message, and transfer the authorization request message to the processor computer 430.

In step S403, the processor computer 430 may store data copied from the authorization request message in a database, and the processor computer 430 may also assign a unique request identifier, such as a transaction ID number, to the authorization request associated with the authorization request message. This unique request identifier may be referenced later to access information about the associated authorization request message and may be used to help route additional messages, such as reversal and cancellation messages, to the proper authorization entity. The request identifier may be unique only within a specific period of time, e.g., within a day.

A database record may be generated by the processor computer 430 with a field that includes the request identifier, such that in the event of receiving a reversal message with cancellation data flagged in the data elements of the reversal message (e.g., to identify the cancellation type that occurred), the cancellation data may be stored in association with the correct request identifier on the database. A multitude of cancellation data and cancellation messages may be stored in association with a multitude of request identifiers. Any additional authorization requests, whether or not they are corresponding to the same or to additional access devices, may be given additional request identifiers by the processor computer 430. Any cancellation data and additional cancellation messages that are sent to the processor computer from any additional access devices may be associated with the respective additional request identifiers and may also be stored within the database.

In step S404, the processor computer 430 may transfer the authorization request message to transport computer 440. The transport computer 440 may receive the authorization request message, and may read any routing data that may be contained within the message.

In step S405, the transport computer 440 may route the authorization request message to an authorizing entity, such as authorization server 450.

In step S406, the authorization server 450 may receive and process the authorization request message and generate an authorization response message based on the data contained in the authorization request message.

In step S407, the authorization server 450 may transmit the authorization response message to the transport computer 440, which may read routing information and request identification data from the data elements of the authorization response message.

In step S408, the transport computer 440 may pass the authorization response message to the processor computer 430. The processor computer 430 may update the data stored in step S403 to reflect that the authorization request associated with the unique request identifier has been successfully authorized.

In step S409, the processor computer 430 may transfer the authorization response message to the gateway computer 420. The gateway computer 420 may read routing information contained within the authorization response message.

In step S410, the electronic access device 410 may be triggered to cancel the authorization request in mid-process. This cancellation may occur at any point during the authorization request process, and the cancellation may be initiated by the user, by a trusted third-party such as a merchant, or automatically due to a system outage or a timeout event, or by any other desired stimulus. Accordingly, the processor computer 430 can receive the cancellation data before the access device receives an authorization response message for accessing the protected resource. For example, as shown, the electronic access device 410 never receives the authorization response from gateway computer 420. As other examples, the cancellation data can be received by the processor computer 430 before the authorization response is received by the processor computer 430 or before it is generated by authorization server 450.

The electronic access device 410 may store the cancellation data, including the reason for cancellation, on local memory of the electronic access device 410, or the electronic access device 410 may store cancellation data exclusively on an off-site memory location, such as on a database associated with a processor computer 430. The electronic access device 410 may also employ a "hybrid" method, where the data may be stored both onsite and in a remote database.

After the electronic access device 410 is triggered to cancel an authorization request, a local API, SDK, app, applet, or any other form of executable code may generate a reversal request message with the cancellation details stored in the data elements of the message, such as the time of cancellation, the type of cancellation, etc. The reversal request message with the cancellation data, such as a cancellation type flag or any other type of cancellation data or flags, may then be sent to the gateway computer 420. In other embodiments, the cancellation data may be sent to the gateway computer 420 and/or to the processor computer 430, which can then generate the reversal request message.

In step S411, the gateway computer 420 may send the reversal request message to the processor computer 430. The processor computer 430 may receive the reversal request message and read the cancellation data and other data stored in the reversal request message. Responsive to receiving the cancellation data, the cancellation data can be stored in the database record that was previously generated. In this manner, the cancellation data can be stored in association with the request identifier, which is in a field of the database record.

In step S412, the processor computer 430 may void any data associated with the original authorization request message of the cancelled authorization request that the processor computer 430 may have stored in step S403. The processor computer 430 may identify this data based on the unique request identifier assigned to the authorization request in step S403. The processor computer 430 may then store the cancellation data embedded in the reversal message in place of the original stored data saved from the authorization request message in step S403.

In step S413, the processor computer 430 may transfer the reversal request message to the transport computer 440. The transport computer 440 may receive the reversal request message and may read any routing data that is contained within the message.

In step S414, the transport computer 440 may use the routing data contained in the reversal request message to route the message to authorization server 450, which may be the same authorization entity that was associated with the authorization request and response message in step S406.

In step S415, the authorization server 450 may receive and process the reversal request message and generate a reversal response message based on the data contained in the reversal request message.

In step S416, the authorization server 450 may transfer the reversal response message to transport computer 440. Transport computer 440 receives the reversal response message and may read routing data from the data elements of the message.

In step S417, the transport computer 440 may route the reversal message to the processor computer 430. The processor computer may receive the reversal response message and may read the data in the message.

In step S418, the processor computer 430 may transfer the reversal response message to the gateway computer 420. The reversal response message may be received by the gateway computer 420, which may read routing information from the message.

In step S419, the gateway computer 420 may transfer the reversal response message to the electronic access device 410. The reversal response message may be received by the electronic access device 410 and the data contained in the message may be read by the electronic access device.

In step S416, the electronic access device 410 may display the reversal response to the user and the merchant.

In step S417, after the reversal response has been successfully processed and displayed to the user and merchant, the processor computer 430 may generate a cancellation message based on the cancellation data stored in step S410. The cancellation message may contain information about the type of cancellation, the time of cancellation, the time when the original authorization request message was generated, references to the original authorization request message, etc. The cancellation message may then be sent to the transport computer 440, where the cancellation message may be routed to any authorizing entity necessary in order to verify the authorization request cancellation and reconcile the authorization status of the associated account with all necessary authorizing entities. It may also format and route the data to any regulatory authority.

The processor computer 430 may generate additional cancellation messages for additional authorization requests corresponding to additional access devices. Each of the additional cancellation messages can have a respective request identifier, which may be unique within a specified time period (e.g., a day, twelve hours, etc.). The cancellation message and the additional cancellation messages within a specified time period can be aggregated to form a batch message, where the cancellation message is sent to the transport computer in the batch message. Batch messages can be sent periodically, e.g., after the specified time period has ended.

C. Example Reversal Message

Figure 5:
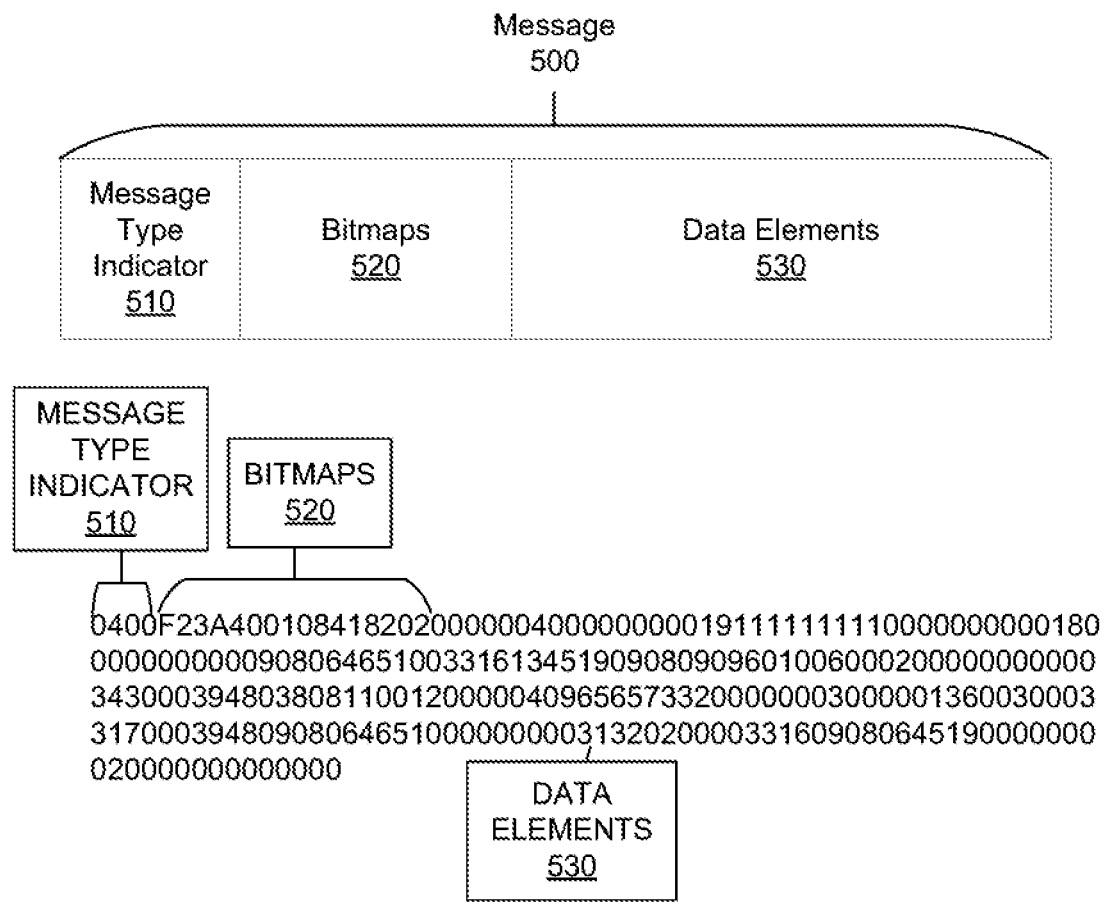
FIG. 5 demonstrates an example of an message, which could be used for authorization request and reversal messages, according to some embodiments of the disclosure.

FIG. 5 demonstrates a diagram of an exemplary reversal message 500 according to the embodiments. The example reversal message is shown in a hexadecimal format, but may also be expressed in binary. Reversal message 500 may be in a similar format as an ISO 8583 0400 reversal message, but the embodiments are in no way restricted, and may use any types of network messages or any other message formatting types. As shown, reversal message 500 includes a message type indicator 510, bitmaps 520, and data elements 530.

The message type indicator 510 comprises the first four digits of hexadecimal code comprising the ISO message. For example, a message beginning with 0100 is recognized as being an authorization message, while a message beginning with 0400 is recognized as being a reversal message. A processor computer may use this message type indicator to immediately recognize the type of message being received and thus what type of data to expect in the data elements of the message. This allows the processor computer to know where to search in the data elements for required information, and may be used in order to save cancellation data from the data elements of a reversal request message to a database, as shown in step S412 in FIG. 4.

The bitmaps 520 are the sixteen hexadecimal digits immediately after the message type indicator 510. Each binary bit corresponding to the hexadecimal value represents the presence or absence (depending on a bit value of 1 or 0) of a corresponding data element. The bitmap allows a computer to quickly identify the expected data types contained within the message.

The data elements 530 are comprised of the rest of the code after the bitmaps 520. The data elements may contain any information needed for the message, and may vary in length depending on the data included in the data element 530. The data included may be everything from a transaction amount (if applicable), personal account information, routing information, etc.

It should be noted that authorization methods may be formed by following numerous formatting standards. ISO 8583 is used here merely as an exemplary standard, and the embodiments of the disclosure are in no way restricted to the use of ISO 8583 messaging formatting.

III. Example Devices

A. Electronic Access Device

Figure 6:
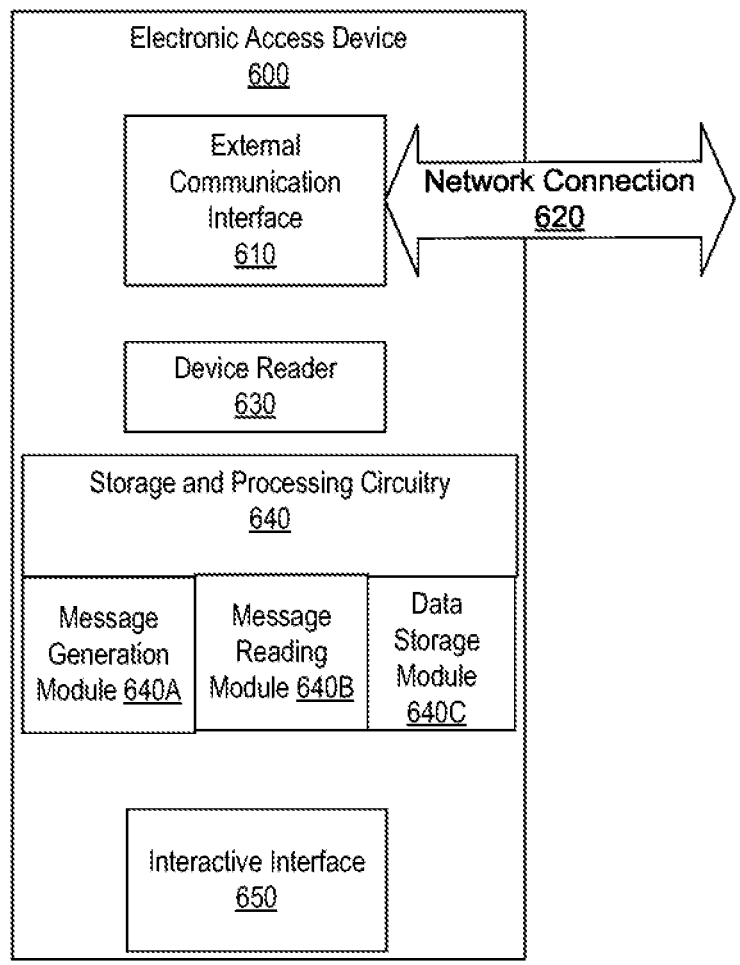
FIG. 6 details a typical electronic access device that may be used during the transaction process, according to some embodiments of the disclosure.

FIG. 6 shows a block diagram of an example electronic access device 600 according to some of the embodiments of the disclosure. The electronic access device 600 may include circuitry and potentially software modules that are used to enable certain device functions, such as interacting with a user and communicating with computer networks. Circuitry may be implemented with dedicated circuitry or programmable circuitry, which may be shared across modules.

The functional elements responsible for enabling those functions may include an external communication interface 610, which can be used to link with and exchange data with a network of computers via a network connection 620. Device reader 630 may be capable of interacting with and scanning data from an outside device, such as a mobile phone or card. This may include both contactless and contact interactions. Storage and processing circuitry 640 represents the hardware running all of the digital functions of the electronic access device 600 and for storing data such as executable code, processing data, and message data. Interactive interface 650 can be a device such as a touch screen or a screen with analog buttons that allows a user to interact with and respond do the electronic access device 600.

Storage and processing circuitry 640 can perform various functions. For example, the message generation module 640A can generate authorization request and reversal messages, as well as any other types of messages that may be necessary. Message reading module 640B can read the data from incoming messages and store it into the memory of the device. This stored data can be used to generate messages populated with the data, or may be used to store transaction data for a later reconciliation process, among other uses. The data storage module 640C may store data on the device. Examples of such storage includes cached memory or long-term storage devices, such as a hard drive, according to the embodiments.

B. Processor Computer Server

Figure 7:
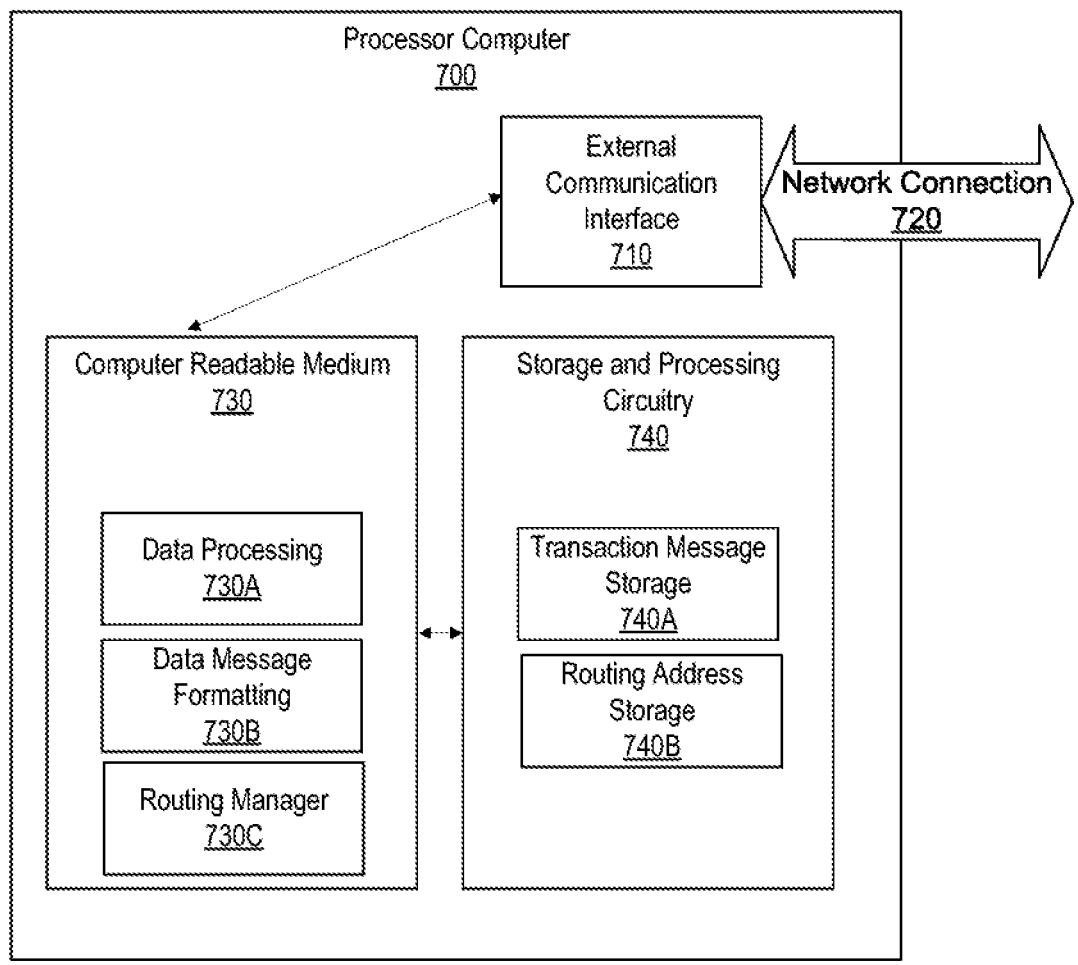
FIG. 7 demonstrates an example server used by a processor computer, according to some embodiments of the disclosure.

FIG. 7 shows a block diagram of some of the components of an exemplary processor computer 700, according to some embodiments of the disclosure. The processor computer 700 may have an external communication interface 710 used to link and exchange data with a computer network via a network connection 720. The processor computer may also have a computer readable medium 730 stored on its hardware. The computer readable medium 730 may have numerous modules included with it, such as a data processing module 730A, a module for data message formatting module 730B, and a routing manager 730C. The processor computer 700 may also be comprised of storage and processing circuitry 740, which may include, among other things, dedicated space for message data storage module 740A and routing address storage module 740B.

A data processing module 730A may include any software module that can be configured to process data associated with messages received through the external communication interface 710. This could include determining message type, content, and identification. For example, data processing module 730A could determine that an incoming message is a reversal request message from an access device associated with a known merchant, and it could determine what data in the received reversal message to extract in preparation of generating a cancellation message.

A data message formatting module 730B may include any software module that can be configured to format data appropriately into a specific message format. This may include formatting a cancellation message, such as an ISO 8583 0146 message, from stored authorization message data associated with a cancelled authorization request.

A routing manager 730C may include any software module that can be configured to route messages within a computer network such that the message arrives at the proper computer in the network. This may include routing a cancellation message to the transport computer, or a reversal response message to the appropriate electronic access device.

A message data storage module 740A may include any circuitry and hardware that can be configured to securely store transaction messaging data, such as authorization request messages, reversal request messages, cancellation messages, and unique transaction identifiers. Message data storage module 740A can be where the authorization data is stored in step S403, and where cancellation data is stored in step S412.

A routing address storage module 740B can be any circuitry and hardware configured to securely store routing information. This could include address information for routing messages to a transport computer or an electronic access device.

C. Authorization Server

Figure 8:
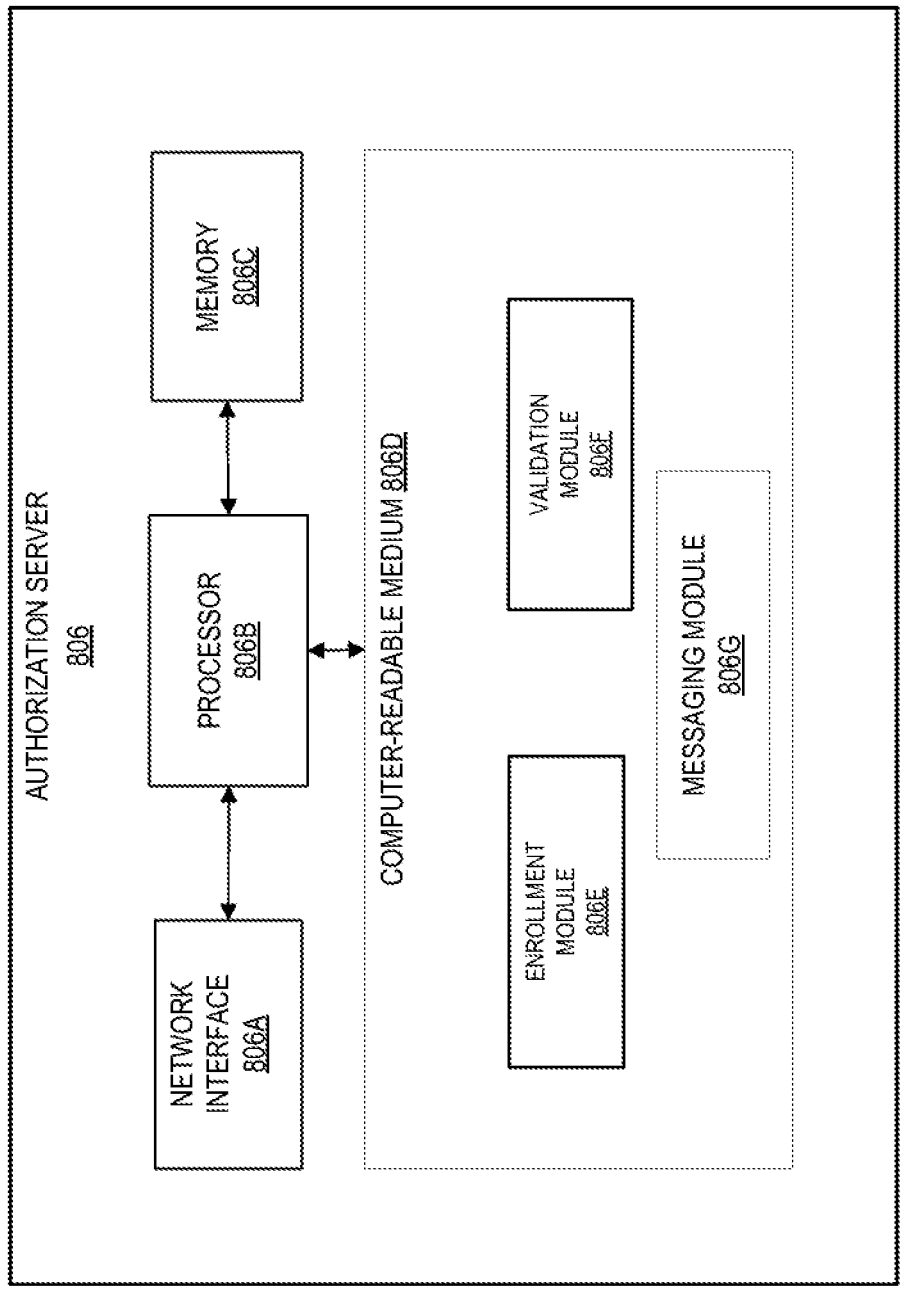
FIG. 8 shows a block diagram of the exemplary components of an authorization server according to some embodiments of the disclosure

FIG. 8 shows a block diagram of the exemplary components of an authorization server 806, according to some embodiments of the disclosure. The authorization server 806 may be composed of numerous interacting parts and modules that function together to serve a purpose. An authorization server 806 may be composed of a network interface 806A, a processor 806B, a memory 806C, and the processor may contain computer readable medium 806D that itself may contain numerous modules, such as enrollment module 806E, validation module 806F, and messaging module 806G, among others.

Network interface 806A can be any hardware and software used to allow the authorization server to interact with a network of computers, including local networks or the Internet. The network interface 806A could be connected to a network of computers via a wired or wireless connection, and may exchange data between the authorization server and other computers also connected to the network.

Processor 806B can be any combination of hardware and software used to process data and execute programmed commands. A processor 806B could be the CPU of an individual computer or it could be a cluster of computers designed to work together as a single unit. A processor 806B contains hardware to read from and write to a computer readable medium 806D.

Memory 806C can be where data may be stored on the authorization server 806. This may be in the form of a local hard drive or a remote memory storage unit, such as a cloud drive. The memory 806C may store data such as credentials for users authorized to access protected resources and data corresponding to protected resources themselves, such as account data or securely stored data.

Computer readable medium 806D can be any combination of hardware and software such that data may be read and commands executed within the processor 806B. The computer readable medium 806D may contain numerous modules dedicated to performing specific tasks and data manipulations.

Computer-readable medium may contain an enrollment module 806E, that may enroll new users and record their account and credential information such that their identities may be recognized later upon presenting proper credential and account information. The enrollment module 806E may work with the processor 806B and the memory 806C to read and record a new user's data, or to update an existing user's data. By this way, the list of credentials authorized for accessing a protected resource may updated.

Another module that may be contained within the computer-readable medium is the validation module 806F. The validation module 806F may work with the processor 806B and the memory 806C to read data from messages received through the network interface 806A. The validation module 806F may compare the data contained within the message to data stored in memory 806C to determine whether the message contains authorized credentials for accessing a protected resource.

Another module that may be contained within the computer readable medium 806D is the messaging module 806G. The messaging module may be capable of reading and generating messages received through network interface 806A. The messaging module may be used to pass data contained in a received message to either the enrollment module 806E or the validation module 806F according to some embodiments. The messaging module 806G may also receive data from the validation module 806F or the enrollment module 806E, and the messaging module 806G may use that received data to generate a message, such as an authorization response message. The messaging module may also pass a generated message to the processor 806B to be sent through the network interface 806A to another computer in the network.

IV. Cancellation Process

Figure 9:
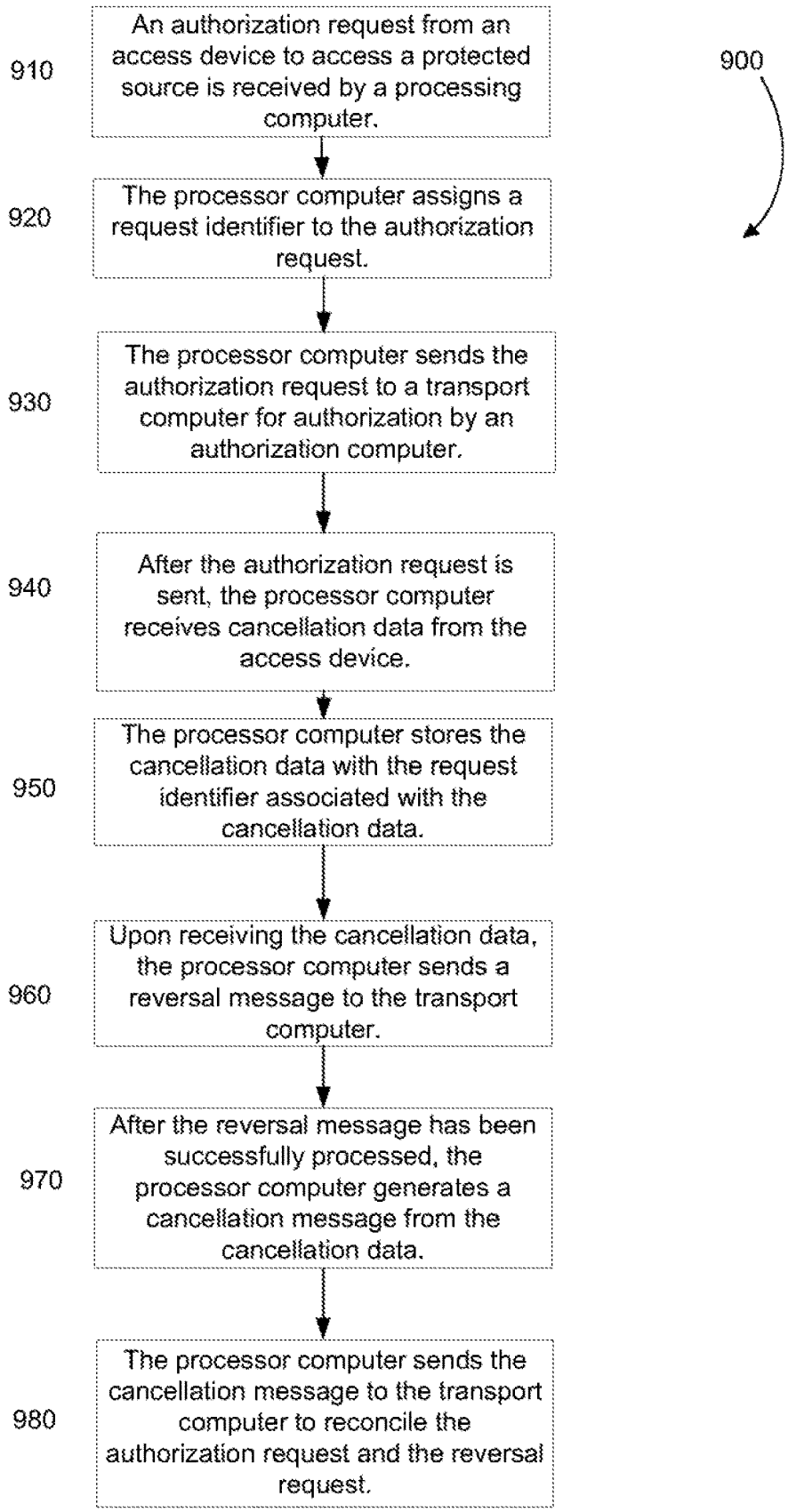
FIG. 9 shows a flow diagram detailing the steps involved with a cancelled transaction to form the cancellation message containing the cancellation data, according to some embodiments of the disclosure.

FIG. 9 shows a flow diagram of an exemplary method 900 for managing cancelation of an authorization request in mid-process. Method 900 involves using an electronic access device and a processor computer to process an authorization request message and transfer it via a transport computer to an authorization computer on a computer network. The cancellation may occur in a similar manner as described above.

At step 910, an electronic access device (e.g., 120 of FIG. 1) may generate an authorization request message and send the authorization request message to the processor computer. The authorization request message may be received by the processor computer and the data contained in the message may be read by the processor computer.

In step 920, the processor computer may assign a request identifier to the authorization request message. The request identifier can be in the form of an authorization request ID number, and may be saved to a secure database on or connected to the processor computer. The request identifier may be unique over a certain time period, e.g., per day.

A database record may be generated with a field that includes the request identifier, such that in the event of receiving a reversal message with cancellation data, which may be referenced by a flag in the data elements of the reversal message, the cancellation data may be stored in association with the correct request identifier on the database. A multitude of cancellation data and cancellation messages may be stored in association with a multitude of request identifiers. Any additional authorization requests, whether or not they are corresponding to the same or to additional access devices, may be given additional request identifiers, and any cancellation data and additional cancellation messages that are sent to the processor computer from any additional access devices may be associated with the respective additional request identifiers and may also be stored with a database.

In step 930, the processor computer may then transfer the authorization request message to a transport computer that may be associated with the electronic access device that generated the authorization request message. The transport computer can then route the message to an authorization server for the authorization request message to be authorized.

In step 940, after the authorization request message is successfully transferred from the processor computer to the transport computer, the processor computer may receive a reversal request message from the electronic access device that contains embedded cancellation data, such as a cancellation data flag associated with a request identifier, in the data elements of the reversal request message. The processor computer may then match the reversal request message to the original authorization request message using the unique request identifier assigned to the original authorization request message in step 920. The processor computer can determine the reversal message includes the cancellation data flag, a reference to the cancellation data, or any other kind of cancellation data based on a type indicator in the reversal message, e.g., as described for FIG. 5. The cancellation data can be received in the reversal message that is received from the access device or a gateway computer.

In step 950, the processor computer may read the data contained in the data elements of the reversal request message and identify the pertinent cancellation data embedded within the data elements of the reversal request message. The cancellation data that may be stored in or referenced by the reversal request message can include cancellation type and cancellation time, and correspond to a state of the access device that causes a cancellation. The state of the access device may include whether the cancellation occurred due to the removal of a user device, due to a time-out event, the selection of a cancellation button, etc. The processor computer may then save the cancellation data to a database.

In step 960, after storing the cancellation data contained in the reversal message, the processor computer may send the reversal request message to the transport computer in order to route the reversal request message to an authorizing entity (e.g., the authorization server 160 in FIG. 1). The authorization server may read the data from the reversal request message, and may determine whether or not to authorize the reversal based on criteria programmed into the authorization server. Upon determining whether or not to authorize the reversal, the authorization server may send a reversal response message with the results of the authorization status of the reversal to the transport computer.

In step 970, after the reversal request message is successfully processed and the authorization request is successfully reversed, the processor computer may then generate a cancellation message from the cancellation data stored and/or referenced from the reversal request message during step 940. Additionally, the main body of the cancellation data may come from data stored from the original authorization request message, or any other data source.

In step 980, the processor computer may send the cancellation data to the transport computer to be sent to any authorizing entities necessary to reconcile the authorization status of the original authorization request with the reversal request so that all authorizing entities required are in agreement as to the authorization status of the transaction. This may be accomplished with a single batch message, where all cancellation messages are batched together and sent out as a single message. These cancellation messages may also be used to meet the regulatory requirements of different markets that may require information about a cancelled authorization request to be sent to a regulatory authority.

V. Exemplary Computer System

Figure 10:
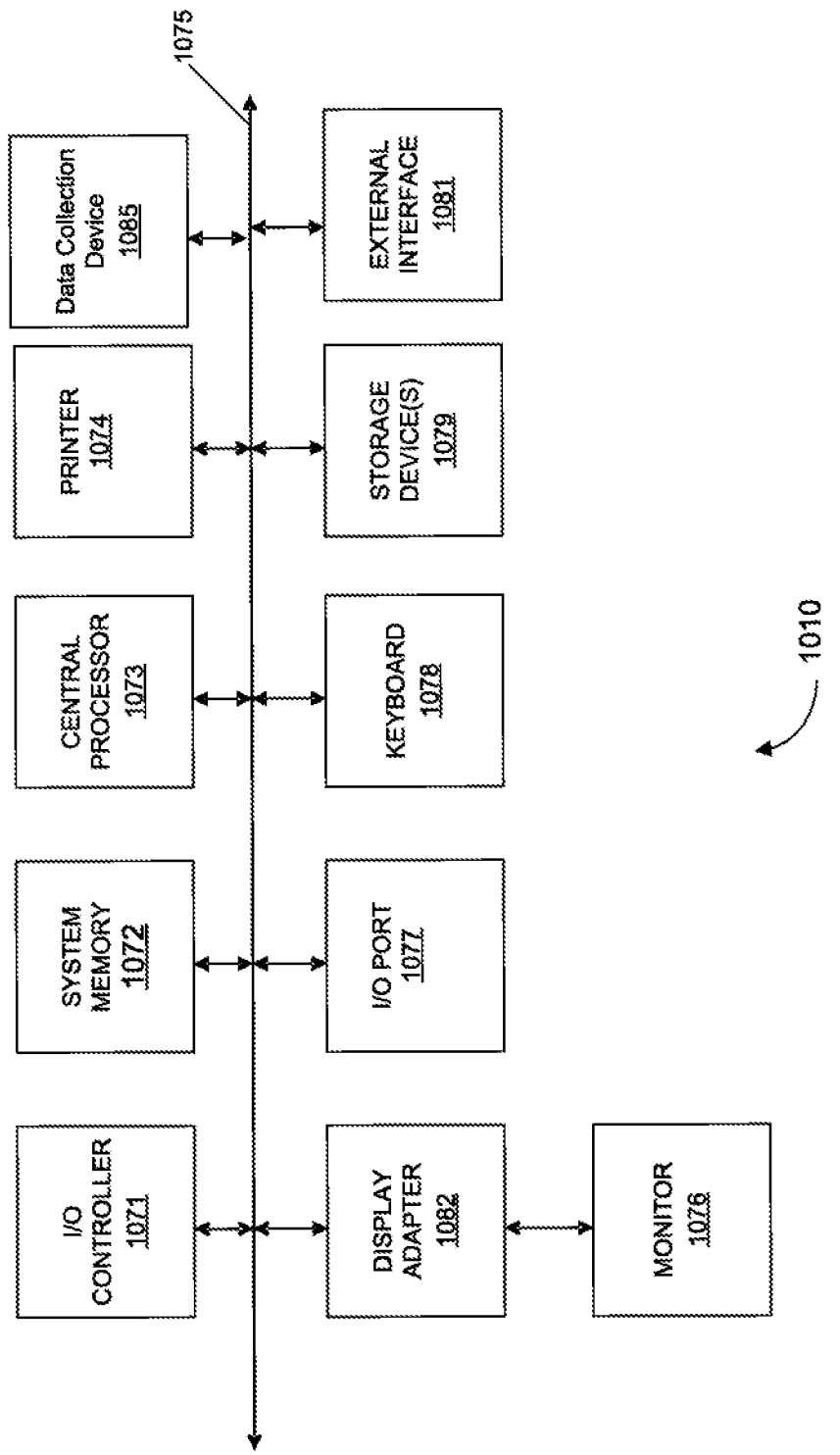
FIG. 10 shows a block diagram of an exemplary computer system, according to some embodiments of the disclosure.

Any of the computer systems mentioned herein may utilize any suitable number of subsystems. Examples of such subsystems are shown in FIG. 10 in computer system 1010. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 10 are interconnected via a system bus 1075. Additional subsystems such as a printer 1074, keyboard 1078, storage device(s) 1079, monitor 1076 (e.g., a display screen, such as an LED), which is coupled to display adapter 1082, and others are shown. Peripherals and input/output (I/O) devices, which couple to I/O controller 1071, can be connected to the computer system by any number of means known in the art such as input/output (I/O) port 1077 (e.g., USB, FireWire®). For example, I/O port 1077 or external interface 1081 (e.g. Ethernet, Wi-Fi, etc.) can be used to connect computer system 1010 to a wide area network such as the Internet, a mouse input device, or a scanner. The interconnection via system bus 1075 allows the central processor 1073 to communicate with each subsystem and to control the execution of a plurality of instructions from system memory 1072 or the storage device(s) 1079 (e.g., a fixed disk, such as a hard drive, or optical disk), as well as the exchange of information between subsystems. The system memory 1072 and/or the storage device(s) 1079 may embody a computer-readable medium. Another subsystem is a data collection device 1085, such as a camera, microphone, accelerometer, and the like. Any of the data mentioned herein can be output from one component to another component and can be output to the user.

A computer system can include a plurality of the same components or subsystems, e.g., connected together by external interface 1081, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A method for managing access to a protected resource using network messages, the method comprising performing, by a processor computer:
   receiving an authorization request to access the protected resource, the authorization request generated by an access device;
   assigning a request identifier to the authorization request;
   sending the authorization request to a transport computer for authorization by an authorization computer;
   after sending the authorization request, receiving cancellation data, wherein the processor computer receives the cancellation data before the access device receives an authorization response message for accessing the protected resource;
   storing the cancellation data in association with the request identifier;
   in response to receiving the cancellation data, sending a reversal message to the transport computer;
   after sending the reversal message, generating a cancellation message using the cancellation data; and
   sending the cancellation message to the transport computer for reconciling the authorization request and the reversal message.

2. The method of claim 1, wherein the cancellation data includes a state of the access device that causes a cancellation.

3. The method of claim 1, wherein the cancellation message includes a type of cancellation performed and the request identifier associated with the authorization request that was cancelled.

4. The method of claim 1, wherein the access device is connected to the processor computer via a gateway computer, and wherein the gateway computer generates the reversal message, and wherein the cancellation data is received by the processor computer from the gateway computer.

5. The method of claim 1, further comprising:
   generating additional cancellation messages for additional authorization requests corresponding to additional access devices, each of the additional cancellation messages having a respective request identifier.

6. The method of claim 5, further comprising:
   aggregating the cancellation message and the additional cancellation messages to form a batch message, and wherein the cancellation message is sent to the transport computer in the batch message.

7. The method of claim 6, wherein request identifiers are unique within a specified time period corresponding to the batch message.

8. The method of claim 1, wherein the cancellation message includes the request identifier.

9. The method of claim 1, further comprising:
   generating a database record having a field that includes the request identifier; and
   responsive to receiving the cancellation data, storing the cancellation data in the database record, thereby storing the cancellation data in association with the request identifier.

10. The method of claim 9, wherein the cancellation data is received in the reversal message that is received from the access device or a gateway computer, the method further comprising:
    determining the reversal message includes the cancellation data based on a type indicator in the reversal message.

11. A server computer for managing access to a protected resource using network messages, the server computer comprising:
    one or more processors; and
    a computer readable medium storing a plurality of instructions that, when executed by the one or more processors, cause the one or more processors to perform a method comprising:
    receiving an authorization request to access the protected resource, the authorization request generated by an access device;
    assigning a request identifier to the authorization request;
    sending the authorization request to a transport computer for authorization by an authorization computer;
    after sending the authorization request, receiving cancellation data, wherein the one or more processors receive the cancellation data before the access device receives an authorization response message for accessing the protected resource;
    storing the cancellation data in association with the request identifier;
    in response to receiving the cancellation data, sending a reversal message to the transport computer;
    after sending the reversal message, generating a cancellation message using the cancellation data; and
    sending the cancellation message to the transport computer for reconciling the authorization request and the reversal message.

12. The server computer of claim 11, wherein the cancellation data includes a state of the access device that causes a cancellation.

13. The server computer of claim 11, wherein the cancellation message includes a type of cancellation performed and the request identifier associated with the authorization request that was cancelled.

14. The server computer of claim 11, wherein the server computer is connected to the access device via a gateway computer that is configured to generate the reversal message that is received by the server computer.

15. The server computer of claim 11, wherein the method further comprises:
generating additional cancellation messages for additional authorization requests corresponding to additional access devices, each of the additional cancellation messages having a respective request identifier.

16. The server computer of claim 15, wherein the method further comprises:
aggregating the cancellation message and the additional cancellation messages to form a batch message, and wherein the cancellation message is sent to the transport computer in the batch message.

17. The server computer of claim 11, wherein the cancellation message includes the request identifier.

18. The server computer of claim 11, wherein the method further comprises:
generating a database record having a field that includes the request identifier; and
responsive to receiving the cancellation data, storing the cancellation data in the database record, thereby storing the cancellation data in association with the request identifier.

19. The server computer of claim 18, wherein the server computer is configured to receive the reversal message from the access device or a gateway computer, and wherein the method further comprises:
determining the reversal message includes the cancellation data based on a type indicator in the reversal message.

* * * * *